(12) United States Patent
Lang et al.

(10) Patent No.: US 11,815,466 B2
(45) Date of Patent: Nov. 14, 2023

(54) FLEXIBLE DISPLAY INSPECTION SYSTEM

(71) Applicant: Hong Kong Applied Science and Technology Research Institute Company Limited, Hong Kong (CN)

(72) Inventors: Qi Lang, Hong Kong (CN); Jinbo Jiang, Hong Kong (CN); Changli Wu, Hong Kong (CN)

(73) Assignee: Hong Kong Applied Science and Technology Research Institute Company Limited, Hong Kong (CN)

(*) Notice: Subject to any disclaimer, the term of this patent is extended or adjusted under 35 U.S.C. 154(b) by 309 days.

(21) Appl. No.: 17/367,790

(22) Filed: Jul. 6, 2021

(65) Prior Publication Data

US 2023/0015878 A1   Jan. 19, 2023

(51) Int. Cl.
| | |
|---|---|
| *G01N 21/88* | (2006.01) |
| *G02B 27/00* | (2006.01) |
| *G02B 3/02* | (2006.01) |
| *G02B 3/14* | (2006.01) |
| *G02F 1/1335* | (2006.01) |
| *G02B 27/10* | (2006.01) |

(Continued)

(52) U.S. Cl.
CPC ......... *G01N 21/8806* (2013.01); *G01N 21/95* (2013.01); *G02B 3/02* (2013.01); *G02B 3/14* (2013.01); *G02B 5/1876* (2013.01); *G02B 27/0025* (2013.01); *G02B 27/1013* (2013.01); *G02F 1/13363* (2013.01); *G02F 1/133528* (2013.01); *G01N 2021/9513* (2013.01); *G01N 2201/063* (2013.01); *G01N 2201/0683* (2013.01)

(58) Field of Classification Search
CPC .... G02B 5/1876; G02B 3/14; G02B 27/1013; G02B 21/0096; G02B 3/02; G02B 27/0025; G02B 21/0016; G02F 1/13363; G02F 1/133528; G02F 1/1309; G01N 21/8806; G01N 21/95; G01N 2201/0683; G01N 2021/9513; G01N 2201/063
See application file for complete search history.

(56) References Cited

U.S. PATENT DOCUMENTS

| | | | |
|---|---|---|---|
| 2005/0207021 A1* | 9/2005 | Yamaguchi | G02B 21/02 359/658 |
| 2008/0055737 A1* | 3/2008 | Yan | G02B 15/144115 359/686 |

(Continued)

*Primary Examiner* — Hoan C Nguyen
(74) *Attorney, Agent, or Firm* — S&F/WEHRW

(57) ABSTRACT

A display inspection system for inspecting a light beam emitted from a panel with pixels positioned at several focal planes is provided. The display inspection system includes a focus tunable lens adjustable in a focal distance for focusing at the panel, a first sensing unit for receiving the light beam, a reduced aberration optical system arranged between the focus tunable lens and the first sensing unit for focusing at the first sensing unit, and one or more optical elements placed within a back focal length of the reduced aberration optical system. The reduced aberration optical system comprises a first serial cascade lens group of a first aplanatic lens and a first doublet lens for correcting an optical aberration. The first aplanatic lens and the first doublet lens are co-configured that the back focal length is extended in a manner that the light beam is incident to the first sensing unit.

21 Claims, 13 Drawing Sheets

(51) Int. Cl.
*G02B 5/18* (2006.01)
*G01N 21/95* (2006.01)
*G02F 1/13363* (2006.01)

(56) References Cited

U.S. PATENT DOCUMENTS

| | | | | |
|---|---|---|---|---|
| 2008/0158693 A1* | 7/2008 | Kang | .................... | G02B 13/18 |
| | | | | 359/708 |
| 2009/0133170 A1* | 5/2009 | Rolland | ............... | G02B 26/105 |
| | | | | 359/213.1 |
| 2010/0157444 A1* | 6/2010 | Wang | .................... | G02B 13/16 |
| | | | | 359/716 |

* cited by examiner

FLEXIBLE DISPLAY INSPECTION SYSTEM

FIELD OF THE INVENTION

The present disclosure generally relates to a system for performing display inspection, and particularly relates to a system that can identify pixel defects and color abnormalities on a flexible display.

BACKGROUND OF THE INVENTION

Different types of display panels are being developed. Particularly, liquid crystal flat panel displays are widely used for most applications. However, the two-dimensional planar display panels cannot achieve a high degree of flexibility for use in curved screens or wearable devices. In recent years, the flexible display has rapidly emerged as the next-generation display, which can be deformed to a convex, a concave, or other irregular shapes as necessary, for example, by bending, rolling, folding, scrolling, or sliding, etc. Such a panel can provide a better user experience and is highly desirable for various wearable and mobile phone applications.

The state-of-the-art flexible display panels come with different resolutions and color depths, with a high pixel density. Given the broad range of colors that can be displayed on the panel, it is challenging to detect pixel-level defects. In some cases, there are color non-uniformities randomly appearing across the panel, which can be a significant impact on the overall display performance and noticeable when displaying certain images. Therefore, defect and color inspections of display panels are vital to safeguard the quality of each display panel.

To ensure the quality of the flexible display panels, each panel is inspected for defects in the latter stage of the manufacturing process. However, the conventional display inspection systems targeting flat panel displays are not suitable for flexible display. In particular, it is difficult to perform pixel defect inspection and color inspection on the periphery area of the flexible display and lacks an automatic system for inspecting the panel when the flexible display is bent to different curved shapes. Therefore, the inspection quality may be compromised and it is hard to guarantee zero defects. In some instances, the flexible display can only be inspected by visual inspection, in which the panel is lit up for an operator to check.

Existing imaging colorimeters and photometers, such as those developed by Radiant Vision Systems, can capture a high-resolution photopic measurement of a display panel. However, the colorimeters and photometers are limited to be used for flat panel display and cannot perform evaluation and characterization of a flexible display. Other inspection equipment commonly used for performing inspection include spectrometer and other pixel defects detectors. However, there is no solution provided that can perform full functions in-line inspection including both pixel defects detection and color inspection on a flexible display. Moreover, the inspection equipment is required to be mechanically mounted to a test jig, and the inspection is performing by multi-axis mechanical movement.

CN 111157542A discloses a defect detection device applied to a curved screen. The defect detection device is characterized in that an optical path extension compensation module is provided for imaging the curved surface of the curved screen. As shown in the drawings, the curved surface is imaged by the camera through a mirror and the optical path extension compensation module, which is arranged on the optical path of the curved surface to shift the image in the axial direction. However, such an inspection device is confined to a particular curved surface. When the flexible display has a complex geometry, the respective optical path extension compensation module would be very difficult to design.

CN 2627501Y provides an automatic detection device for detecting visual defects after lighting the LCD panel. The detection device proposed is characterized in that several cameras are movable vertically and horizontally to capture display images. Although this detection device is not designed for a flexible display, the underlying multi-axis mechanical movement method is generally applied in factories for performing defect inspection on non-planar displays. As this method performs the inspection by mechanical movement, the efficiency and accuracy of the inspection are doubtful.

Accordingly, there is a need in the art for a system that seeks to address at least some of the above problems by performing display inspection on a flexible display. Furthermore, other desirable features and characteristics will become apparent from the subsequent detailed description and the appended claims, taken in conjunction with the accompanying drawings and this background of the disclosure.

SUMMARY OF THE INVENTION

In the light of the foregoing background, it is an objective of the present disclosure to provide an all-in-one integrated inspection system that can perform pixel defect inspection and color inspection on a flexible display. The above object is met by the combination of features of the main claim; the sub-claims disclose further advantageous embodiments of the invention.

In accordance with a first aspect of the present invention, there is provided a display inspection system for inspecting a light beam emitted from a panel comprising pixels positioned at a plurality of focal planes. The display inspection system includes a focus tunable lens adjustable in a focal distance for focusing at the panel; a first sensing unit for receiving the light beam to perform a pixel inspection; a reduced aberration optical system arranged on an optical path between the focus tunable lens and the first sensing unit for focusing the light beam to the first sensing unit; and one or more optical elements placed within a back focal length of the reduced aberration optical system. The reduced aberration optical system comprises a first serial cascade lens group of a first aplanatic lens and a first doublet lens for correcting an optical aberration of the light beam incident from the focus tunable lens. The first aplanatic lens and the first doublet lens are co-configured such that the back focal length is extended in a manner that the light beam is incident to the first sensing unit.

In an embodiment of the first aspect, the first doublet lens is configured to substantially cancel out a longitudinal axial chromatic aberration introduced by the first aplanatic lens.

In an embodiment of the first aspect, the reduced aberration optical system further includes a second serial cascade lens group of a second aplanatic lens and a second doublet lens.

In an embodiment of the first aspect, the first aplanatic lens and the second aplanatic lens are made of H-LAF3B glass material or H-TF3L glass material.

In an embodiment of the first aspect, the first doublet lens and the second doublet lens are made of H-ZPK5 glass material or H-LAK7A glass material.

Preferably, the reduced aberration optical system further comprises an aspherical lens and a meniscus lens sequentially arranged and placed between the first serial cascade lens group and the second serial cascade lens group.

Preferably, the reduced aberration optical system further comprises a converging lens arranged after the second serial cascade lens group on the optical path for directing the light beam through the one or more optical elements to the first sensing unit.

In an embodiment of the first aspect, the focus tunable lens comprises a liquid lens and a front focal plane of the reduced aberration optical system, wherein the liquid lens is adjustable in the focal distance by changing a driving voltage applied.

In an embodiment of the first aspect, the liquid lens is positioned at an aperture position.

In an embodiment of the first aspect, the liquid lens is electrically controllable to fine focus on the plurality of focal planes.

In an embodiment of the first aspect, the one or more optical elements comprise a tunable optical filter configured to extract a predetermined range of wavelength from the light beam and transmit to the first sensing unit.

In an embodiment of the first aspect, the tunable optical filter further comprises a cascade of plural wavelength selectors. Each wavelength selector comprises a first linear polarizer, a retarder, one or more liquid crystal layers, and a second linear polarizer. Each wavelength selector is configured to be electrically controlled to transmit a narrow bandwidth of a wavelength band.

In an embodiment of the first aspect, the tunable optical filter is electrically controllable on a transmission frequency to fine focus on the wavelength bands, thereby a whole field of view wavelength information is obtainable by sequentially increasing or decreasing the transmission frequency of the tunable optical filter.

In an embodiment of the first aspect, the one or more optical elements comprise a beam splitter configured to split the light beam into a first sub-beam incident to the first sensing unit and a second sub-beam incident to a second sensing unit.

In an embodiment of the first aspect, the first sensing unit and the second sensing unit are different and selected from a group consisting of a monochrome camera, a spectrometer, or a spectral camera.

Preferably, the display inspection system includes an optical fiber bundle arranged in conjugated with the spectral camera for conveying a line of the light beam to the monochrome camera or the spectral camera for inspection.

In an embodiment of the first aspect, the second sub-beam passes through a linear Fresnel zone plate for diffracting the second sub-beam to a row of light with different wavelengths, thereby the focus tunable lens is adjusted for selecting a color for inspection.

In an embodiment of the first aspect, the linear Fresnel zone plate comprises a set of repeated rectangular bars alternating between opaque and transparent.

In an embodiment of the first aspect, the back focal length is extended such that the light beam is incident to the first sensing unit with an angle of incidence of less than or equal to +/−6 degrees.

In accordance with a second aspect of the present invention, there is provided a method for inspecting a light beam emitted from a panel comprising pixels positioned at a plurality of focal planes. The method includes the steps of (1) initiating and turning on the panel; (2) placing an inspection system above the panel, wherein the inspection system comprises a camera, a spectrometer, a liquid lens, a reduced aberration optical system, and a tunable optical filter; (3) focusing the camera on a plane surface of the panel; (4) capturing a first image for performing pixel defect inspection; (5) electrically controlling a transmission frequency of the tunable optical filter to select a wavelength band; (6) obtaining a wavelength information for determining any deviations in color; (7) sequentially increasing or decreasing the transmission frequency of the tunable optical filter and obtaining wavelength information for other wavelength bands; and (8) electrically controlling the liquid lens to focus on a curved surface of the panel for performing pixel defect inspection and obtaining wavelength information for the curved surface. The reduced aberration optical system comprises a first serial cascade lens group of a first aplanatic lens and a first doublet lens for correcting an optical aberration of the light beam incident from the liquid lens. The first aplanatic lens and the first doublet lens are co-configured such that a back focal length of the reduced aberration optical system is extended in a manner that the light beam is incident to the camera with an angle of incidence of less than or equal to +/−6 degrees.

In accordance with a third aspect of the present invention, there is provided a method for inspecting a light beam emitted from a panel comprising pixels positioned at a plurality of focal planes. The method includes the steps of (1) initiating and turning on the panel; (2) placing an inspection system above the panel, wherein the inspection system comprises a camera, a spectral camera, a liquid lens, a reduced aberration optical system, and an optical fiber bundle; (3) focusing the camera on a plane surface of the panel; (4) capturing a first image for performing pixel defect inspection; (5) obtaining a one-line wavelength information from the spectral camera, wherein the optical fiber bundle is arranged in conjugated with the spectral camera; (6) moving the platform along a one-axis direction; (7) performing line scanning of another line until a whole field of view wavelength information is obtained; and (8) electrically controlling the liquid lens to focus on a curved surface of the panel for performing pixel defect inspection and obtaining wavelength information for the curved surface. The reduced aberration optical system comprises a first serial cascade lens group of a first aplanatic lens and a first doublet lens for correcting an optical aberration of the light beam incident from the liquid lens. The first aplanatic lens and the first doublet lens are co-configured such that a back focal length of the reduced aberration optical system is extended in a manner that the light beam is incident to the camera with an angle of incidence of less than or equal to +/−6 degrees.

This Summary is provided to introduce a selection of concepts in simplified forms that are further described below in the Detailed Description. This Summary is not intended to identify key features or essential features of the claimed subject matter, nor is it intended to be used as an aid in determining the scope of the claimed subject matter. Other aspects and advantages of the present invention are disclosed as illustrated by the embodiments hereinafter.

BRIEF DESCRIPTION OF THE DRAWINGS

The appended drawings contain figures to further illustrate and clarify the above and other aspects, advantages, and features of the present disclosure. It will be appreciated that these drawings depict only certain embodiments of the present disclosure and are not intended to limit its scope. It will also be appreciated that these drawings are illustrated for simplicity and clarity and have not necessarily been depicted to scale. The present disclosure will now be described and explained with additional specificity and detail through the use of the accompanying drawings in which.

DETAILED DESCRIPTION OF THE INVENTION

The present disclosure generally relates to a system for performing display inspection on a flexible display. More specifically, but without limitation, the present disclosure relates to a system for performing pixel defect inspection and color inspection on a flexible display. An objective of the present disclosure is to develop an all-in-one integrated inspection system for determining the image quality.

The following detailed description is merely exemplary in nature and is not intended to limit the disclosure or its application and/or uses. It should be appreciated that a vast number of variations exist. The detailed description will enable those of ordinary skilled in the art to implement an exemplary embodiment of the present disclosure without undue experimentation, and it is understood that various changes or modifications may be made in the function and structure described in the exemplary embodiment without departing from the scope of the present disclosure as set forth in the appended claims.

The benefits, advantages, solutions to problems, and any element(s) that may cause any benefit, advantage, or solution to occur or become more pronounced are not to be construed as critical, required, or essential features or elements of any or all of the claims. The invention is defined solely by the appended claims including any amendments made during the pendency of this application and all equivalents of those claims as issued.

The terminology used herein is for the purpose of describing particular embodiments only and is not intended to be limiting of the described technology. As used herein, the term "flexible display" refers to a display apparatus that may be physically transformed in a relatively flexible manner. In one embodiment, the flexible display encompasses a bendable display, a curved display, a foldable display, a rollable display, a stretchable display, a twistable display, and the like.

As used herein, the term "spectrometer" or "spectral camera" refers to all such optical devices and systems known in the art capable of measuring the signal strength over a spectrum or over a wavelength interval for evaluating the color intensity.

As used herein, the term "liquid lens" refers to a deformable lens module containing a fluid and having an electrically controllable focal length. By modifying the voltage applied to the liquid lens, the shape thereof can be changed to achieve an adjustment of the focal plane.

Figure 1:
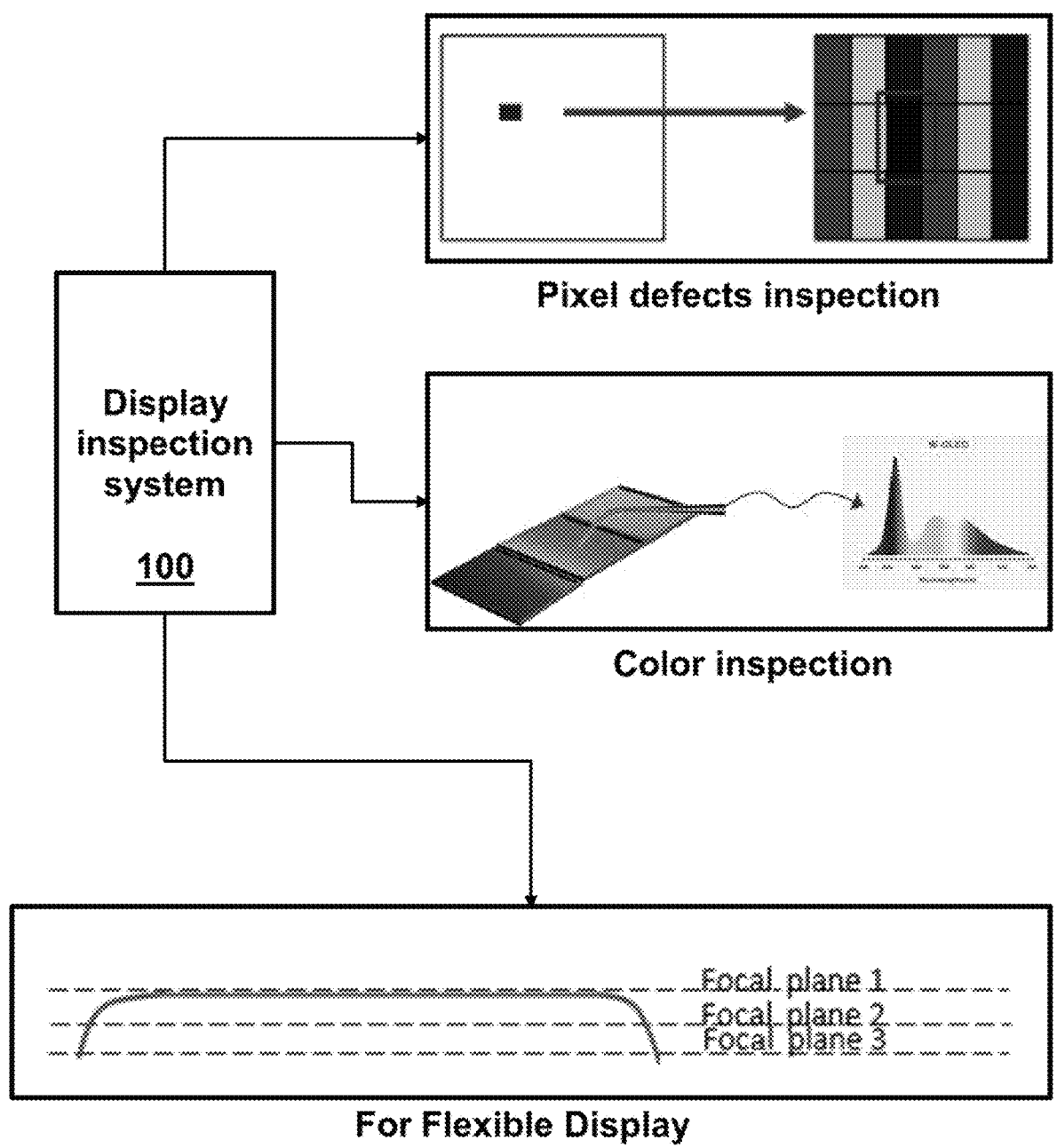
FIG. 1 depicts the purpose of the display inspection system in accordance with certain embodiments of the present disclosure.

The present disclosure relates to a display inspection system 100 for inspecting and/or imaging a panel 10. As shown in FIG. 1, the preferred application of the display inspection system 100 of the present disclosure is for ascertaining the panel condition of a flexible display. The inspections include pixel defect inspection and color inspection, and are preferably operated automatically by using a processing system without any manual handling. The pixel defect inspection identifies pixel defects such as open circuit failure, short circuit failure, line failure, column failure, and other panel defective issues. The color inspection measures the wavelength of the light beam generated from each pixel cell for identifying color defects such as color uniformity, sub-pixel cross-coupling, flickering, and other defective color issues. According to the present invention, the advantage of the display inspection system 100 is to provide an all-in-one system capable of performing a multi-focus optical inspection on a panel 10, wherein the panel 10 is a flexible display comprising an array of pixels arranged in rows and columns for display images. The flexible display arrangement provides the panel 10 with the ability to alter size, shape, and curvature by bending, rolling, folding, scrolling, or sliding, etc. The panel 10 can be deformed such that the pixels are positioned at a plurality of focal planes of the display inspection system 100 separated by some distances apart. In certain embodiments, the panel 10 is not completely flexible and may comprise one or more non-flexible display regions. In certain embodiments, the panel 10 is curved with an uneven surface but not flexible per se and may not be bent or withstand an external mechanical force.

Figure 2:
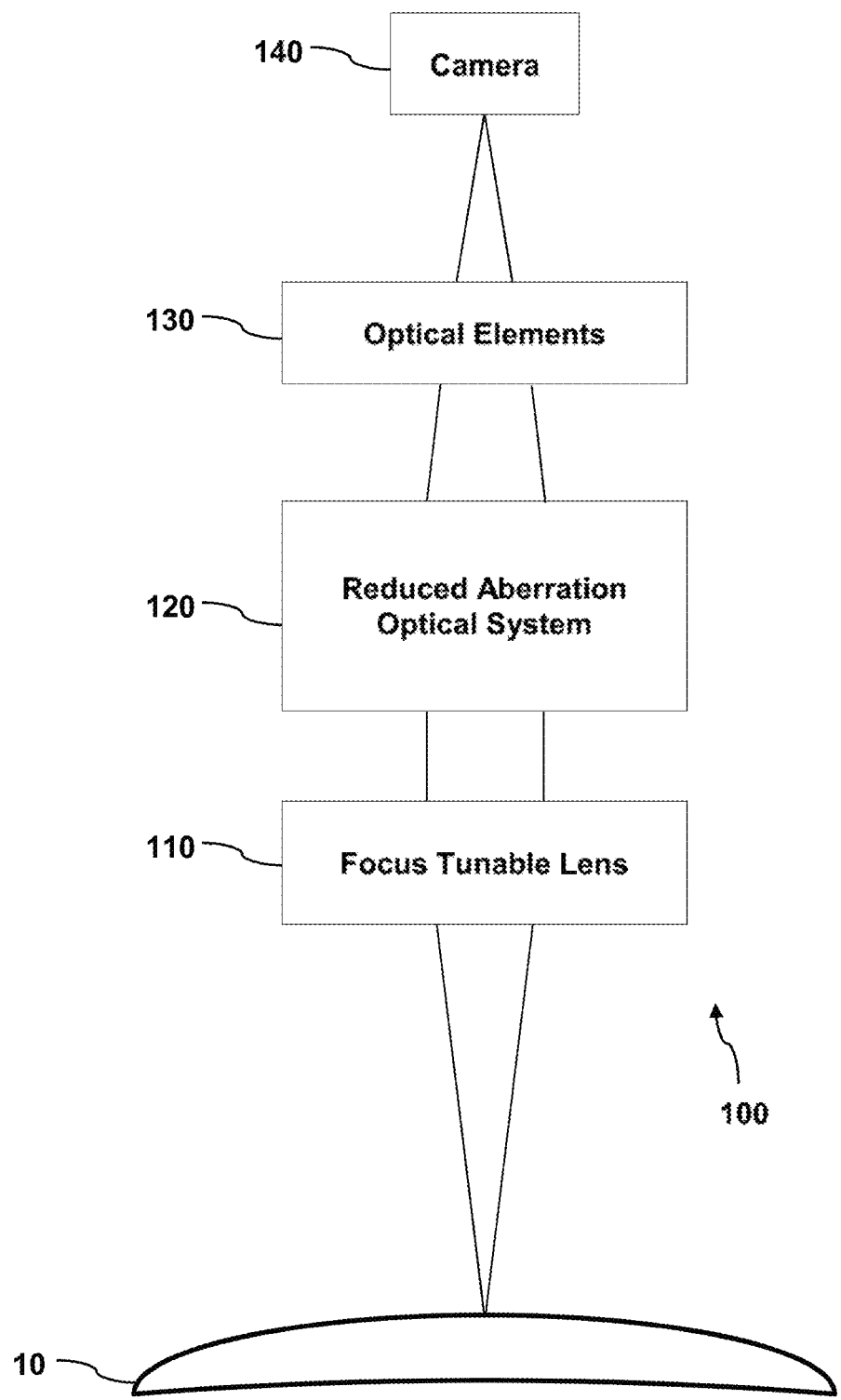
FIG. 2 depicts a system block diagram of the display inspection system in accordance with certain embodiments of the present disclosure.

FIG. 2 shows a conceptual system block diagram of the display inspection system 100. The panel 10 under inspection is the test subject, which can be a flexible display or a flat panel display. The panel 10 must be able to emit light beams, which may generate a light beam directly or include a light source, such as a backlight module, for supplying light to a non-light emitting panel. In one embodiment, the panel 10 is a flexible organic light-emitting diode (OLED) display panel, or other display panels such as but not limited to a liquid crystal display (LCD), an active-matrix OLED display, a micro-LED, a plasma panel display (PDP), a field emission display (FED), a passive matrix electrophoretic display, or other display devices comprised of a plurality of pixels that are capable of displaying images and/or video. In order to ensure the quality of the panel 10, it is required to perform an extensive quality check and inspection using different display patterns, such as full-field patterns (red, green, blue, cyan, magenta, yellow, black, white, middle gray levels, etc.), alternating pixel test patterns (alternating in rows or columns), square checkerboard patterns, and other random or graphic image patterns. The light beam from the panel 10 is directed to the display inspection system 100 for determining the conditions of the panel 10.

The display inspection system 100 comprises a focus tunable lens 110, a reduced aberration optical system 120, one or more optical elements 130, and a first sensing unit 140, such as a camera. The focus tunable lens 110 is adjustable in a focal distance for focusing at the panel 10 with the pixels positioned at the plurality of focal planes. Therefore, if the panel 10 is a flexible display or a curved display, the pixels are positioned on various focal planes. The focus tunable lens 110 may be electrically controlled to focus on each pixel by adjusting the focal distance. The light beam coming from the panel 10 is then received by the focus tunable lens 110, and directed along an optical path incidental to the reduced aberration optical system 120. The reduced aberration optical system 120 is featured with plural optical elements for adjusting an angle of incidence of the light beam for directing the light beam through the one or more optical elements 130 to the first sensing unit 140 without causing a degradation in image quality. The first sensing unit 140 captures a high-resolution photopic measurement and may transmit the data to a processor, a computer, or a cloud system for data analysis. In certain embodiments, the first sensing unit 140 is a high-resolution monochrome camera or a high-resolution color camera.

Figure 3:
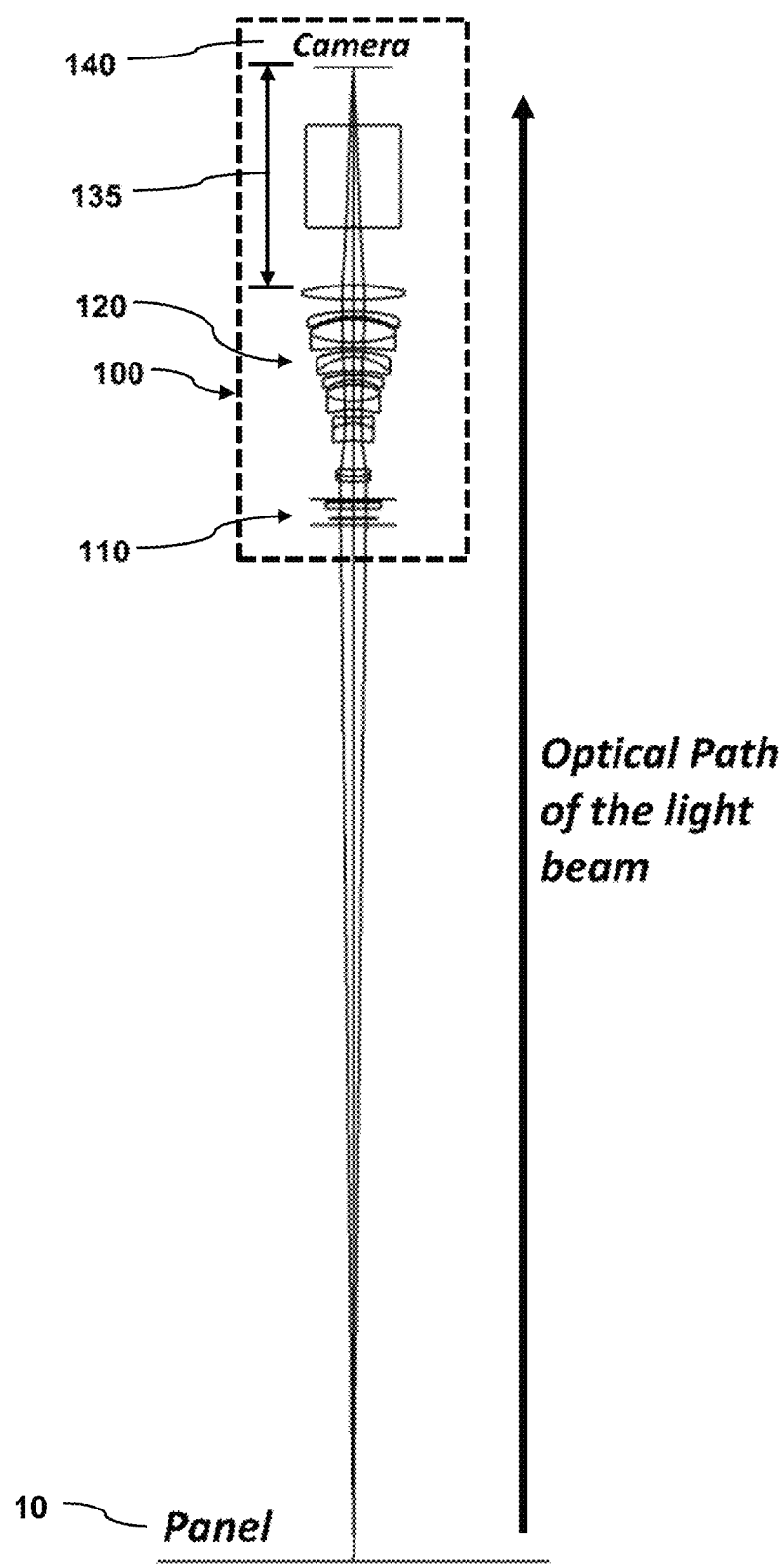
FIG. 3 depicts the display inspection system for inspecting a panel in accordance with certain embodiments of the present disclosure.

As shown in FIG. 3, the display inspection system 100 for inspecting a panel 10 in accordance with certain embodiments of the present disclosure is illustrated. The display inspection system 100 is performing a lighting-on inspection of the panel 10, and the optical path of the light beam is directed toward the display inspection system 100, which is positioned substantially perpendicularly above the panel 10. The display inspection system 100 includes a plurality of lenses arranged along the optical path for focusing the panel and diffracting the light beam to the first sensing unit 140. The back focal length 135 of the reduced aberration optical system 120 is defined as the distance from the vertex of the last lens to the focal point at the first sensing unit 140. The purpose of the present invention is to configure a system that is capable of producing a high image quality so that the condition of the panel 10 can be accurately ascertained. In particular, the display inspection system 100 should be capable of producing high-resolution images with a large field of view (FOV).

Figure 4:
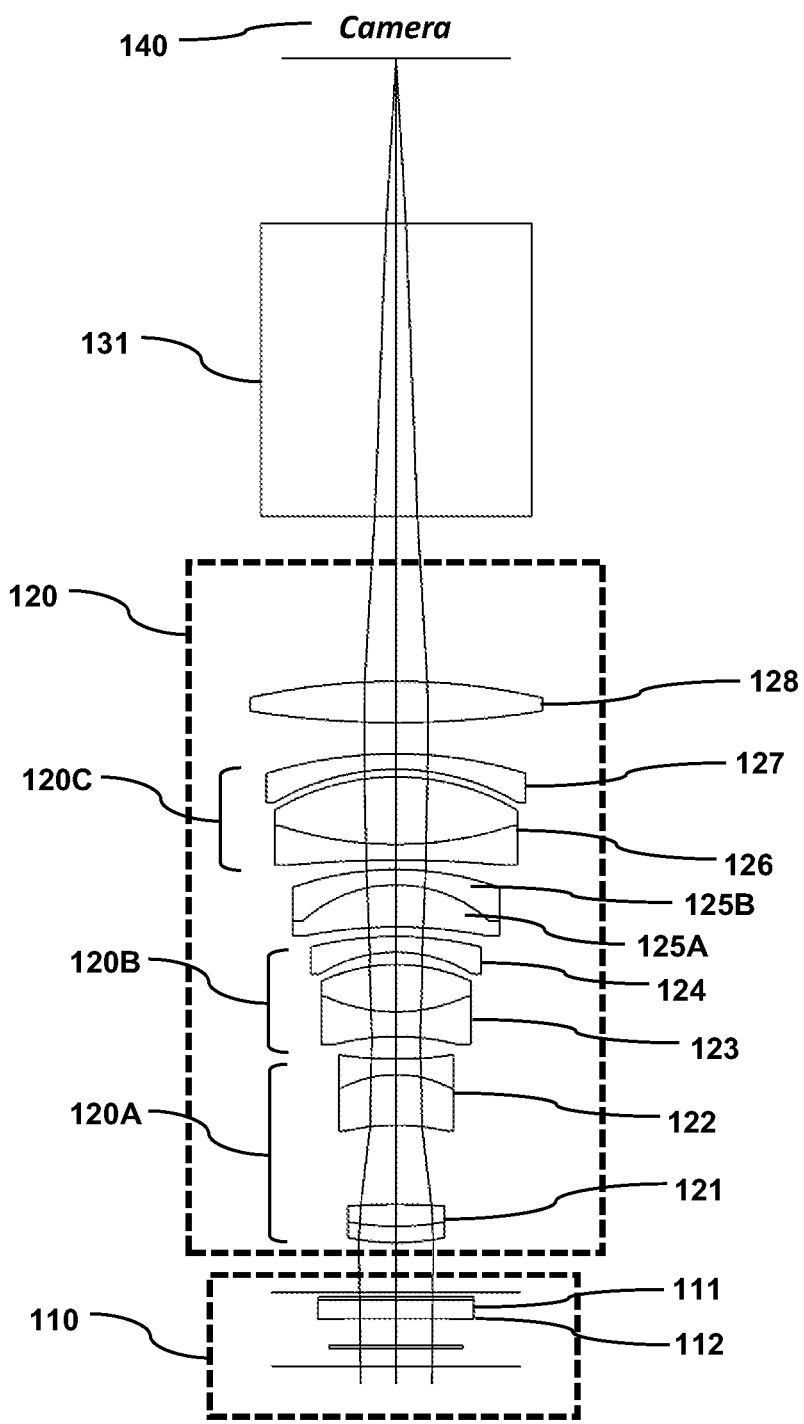
FIG. 4 depicts the internal structure of the display inspection system of FIG. 3.

FIG. 4 shows one exemplary internal structure of the display inspection system 10. The focus tunable lens 110 comprises a liquid lens 111 and a front focal plane 112 of the reduced aberration optical system 120. The liquid lens 111 is preferably positioned at or around the aperture position for focusing at the panel 10 and producing a collimated beam for the reduced aberration optical system 120. Advantageously, the shape of the liquid lens 111 is electrically controllable and can be modified to adjust the focal distance by changing a driving voltage applied. In certain embodiments, the liquid lens 111 comprises a first fluid and a second fluid contained in a chamber. The first fluid and the second fluid are immiscible. The driving voltage is applied to at least two metal plates to provide an electrostatic pressure based on the driving voltage to the second fluid. The radius of curvature of the surface between the first fluid and the second fluid is therefore adjustable by the electrostatic pressure. The front focal plane 112 is arranged in front of the reduced aberration optical system 120.

After the light beam from the panel 10 is received by the focus tunable lens 110, the light beam is transmitted along the optical path to the reduced aberration optical system 120, which is arranged on the optical path between the focus tunable lens 110 and the first sensing unit 140 for focusing the light beam to the first sensing unit 140. The reduced aberration optical system 120 comprises a serial cascade of plural lenses. In the illustrated embodiment, the collimated beam from the focus tunable lens 110 is received by a first lens group 120A for properly shaping the light beam with improved chromatic and spherical aberration, which may include a positive achromatic lens 121 and a negative achromatic lens 122. The positive achromatic lens 121 and the negative achromatic lens 122 may be integrally formed as one piece or as a lens module. Other lenses may also be included depending on the design criteria.

Moving further and advantageously, a first serial cascade lens group 120B of a first aplanatic lens 124 and a first doublet lens 123 for correcting an optical aberration of the light beam incident from the focus tunable lens 120 is provided. The aplanatic lens is chosen in the present disclosure to correct the spherical aberration, coma aberration, and astigmatism aberration. However, an aplanatic lens would bring longitudinal axial chromatic aberration, which is not preferred. Therefore, a doublet lens is used to substantially cancel out and compensate for the longitudinal axial chromatic aberration introduced by the aplanatic lens, such that the aberration of the whole serial cascade lens group can be balanced. In a preferred implementation, the reduced aberration optical system 120 further comprises a second serial cascade lens group 120C of a second aplanatic lens 127 and a second doublet lens 126. In certain embodiments, the aplanatic lens 124, 127 has a thickness of 2.5 mm and is made of H-LAF3B glass material or H-TF3L glass material. In certain embodiments, the doublet lens 123, 126 is made of H-ZPK5 glass material or H-LAK7A glass material.

In certain embodiments, the reduced aberration optical system 120 further comprises an aspherical lens 125A and a meniscus lens 125B sequentially arranged and placed between the first serial cascade lens group 120B and the second serial cascade lens group 120C. The aspherical lens 125A and the meniscus lens 125B may be configured as a doublet lens.

In certain embodiments, the reduced aberration optical system 120 further comprises a converging lens 128 arranged after the second serial cascade lens group 120C on the optical path. The converging lens 128 may be a biconvex lens or a plano-convex lens. The converging lens 128 is configured to direct the light beam through the one or more optical elements 130 at the back focal length 135 of the reduced aberration optical system 120 to the first sensing unit 140.

As comprehensively described above, the structure of the reduced aberration optical system 120 in accordance with certain embodiments of the present disclosure is provided. It is apparent that the combination of lenses and optical elements may be otherwise for producing a high image quality of the panel 10 without departing from the scope and spirit of the present disclosure. The arrangement of a combination of optical lenses having at least the first serial cascade lens group 120B of the first aplanatic lens 124 and the first doublet lens 123 located between the focus tunable lens 110 and the first sensing unit 140 can effectively correct an aberration of the light beam from the liquid lens 111. This resolves the technical difficulties of poor image quality and narrow angle of incidence in the conventional display inspection system. In particular, the poor image quality is caused by the long back focal length. The angle of incidence should be limited to be less than or equal to +/−6 degrees in order to guarantee sufficiently high accuracy. The first aplanatic lens 124 and the first doublet lens 123 are co-configured for extending the back focal length 135, such that the light beam is incident to the first sensing unit 140 with an angle of incidence of less than or equal to +/−6 degrees.

Also provided herein is an arrangement of one or more optical elements 130 placed within the back focal length of the reduced aberration optical system 120. The one or more optical elements 130 comprises a tunable optical filter 131 configured to extract a predetermined range of wavelength from the light beam and transmit to the detection surface of the first sensing unit 140. Preferably, the tunable optical filter 131 includes a tuning mechanism that allows a selection of the range of wavelength for performing the inspection.

Figure 5:
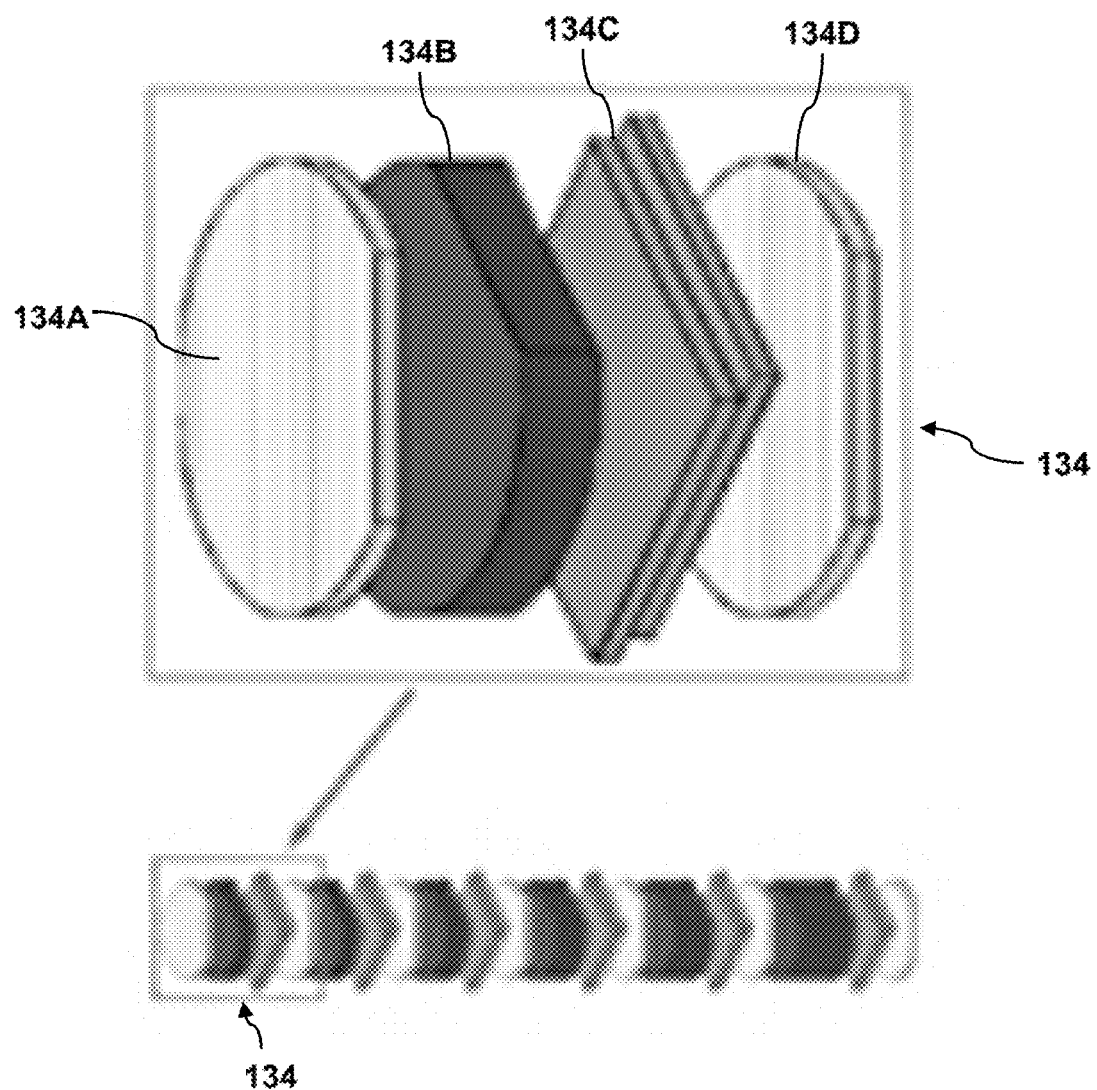
FIG. 5 depicts a first configuration of the optical elements with a tunable optical filter in accordance with certain embodiments of the present disclosure.

In accordance with the first configuration, the tunable optical filter 131 further comprises a cascade of plural wavelength selectors 134, which is illustrated in FIG. 5. The tunable optical filter 131 is electrically controllable to select the wavelength band. Each wavelength selector 134 comprises a first linear polarizer 134A, a retarder 134B, one or more liquid crystal layers 134C, and a second linear polarizer 134D. The first and the second linear polarizers 134A, 134D may have the same or different transmission axis. Each wavelength selector 134 is configured to be electrically controlled to transmit a narrow bandwidth of a wavelength band, thereby a conventional digital camera or a signal detector can be used as the first sensing unit 140 to perform high-resolution photopic measurement.

Figure 6:
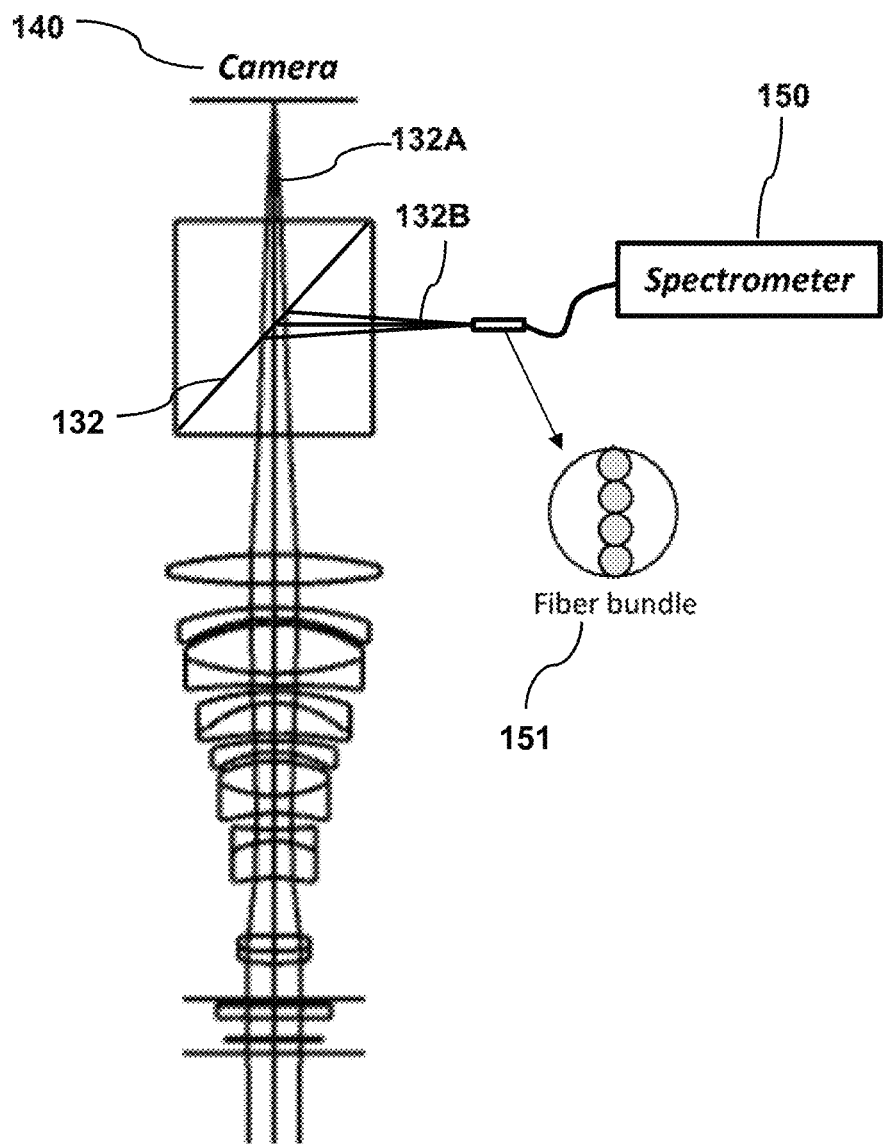
FIG. 6 depicts a second configuration of the optical elements incorporated in the display inspection system in accordance with certain embodiments of the present disclosure.

In accordance with the second configuration, as illustrated in FIG. 6, the one or more optical elements 130 comprise a beam splitter 132 configured to split the light beam into a first sub-beam 132A incident to the first sensing unit 140 and a second sub-beam 132B incident to a second sensing unit 150. The two sensing units allow a simultaneous inspection of the panel 10 with respect to the pixel defects and pixel color (wavelength). Therefore, the first sensing unit 140 and the second sensing unit 150 are different and may be selected from a group consisting of a monochrome camera, a spectrometer, or a spectral camera. The spectrometer is configured to perform wavelength inspection of a pixel, while the spectral camera can detect the spectrum of a line. The beam splitter 132 is aligned at an angle with respect to the optical path. In one embodiment, the angle is 45 degrees such that the second sub-beam 132B is reflected by 90 degrees from the optical path. Depending on the orientation of the beam splitter 132, the second sensing unit 150 is placed at a location 90 degrees clockwise or anticlockwise away from the optical path. The use of the first and second sensing units 140, 150 provides an all-in-one integrated lighting-on inspection system for the flexible or curved display, which is a novel and low-cost solution.

In one embodiment, an optical fiber bundle 151, comprising a plurality of optical fibers is provided. The optical fiber bundle 151 is arranged in conjugated with the surface of the spectral camera, and is used to facilitate the detection of the signal line by line, which particularly provided for conveying a line of the light beam to the monochrome camera or the spectral camera for inspection.

Figure 7:
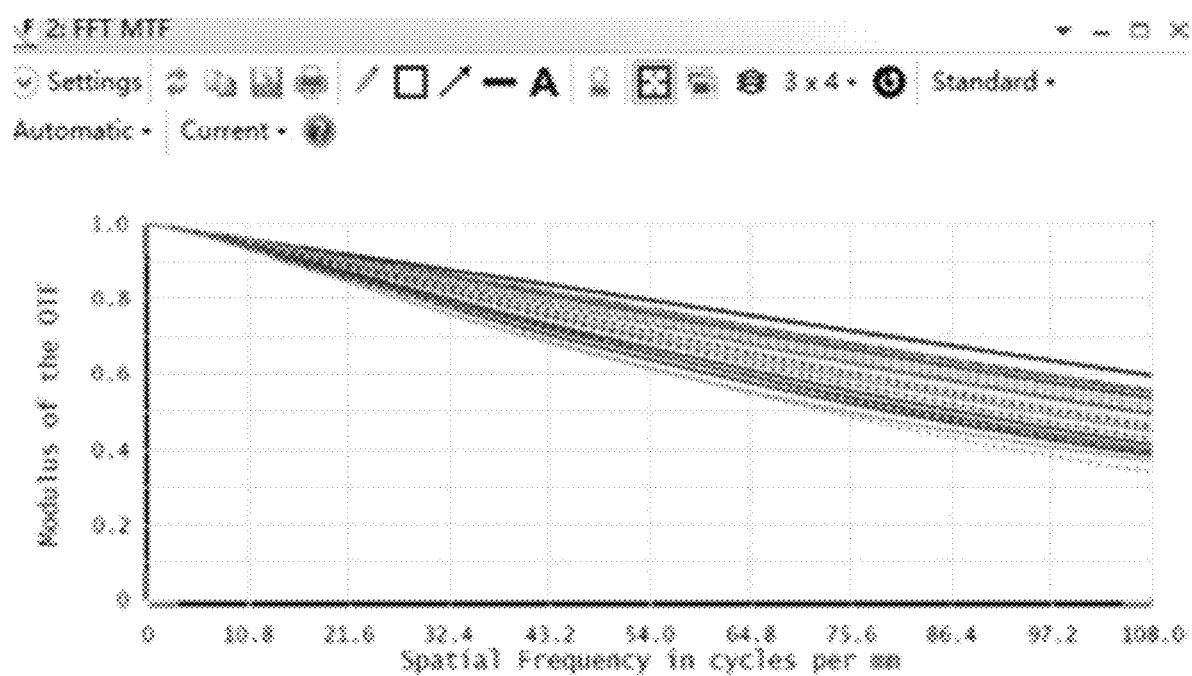
FIG. 7 is a simulated result of the modulation transfer function of the inspection system of FIG. 3.
Figure 8A:
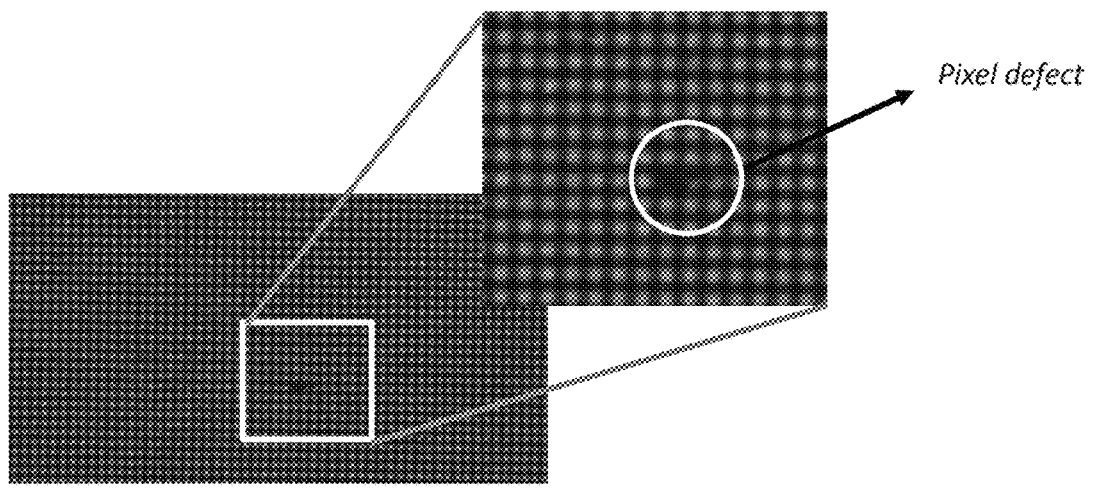
FIG. 8A is a test result captured by the camera for detecting a pixel defect.

FIG. 7 is a simulated result of the modulation transfer function (MTF) of the inspection system 100 when performing pixel defect inspection. The MTF curves show that the inspection system 100 is capable of producing high-quality and high-resolution images with larger FOV. The MTF is >0.3 at a spatial frequency of 1081 p/mm. The resolution is 7920×6004 pixels with a large FOV of 180 mm (diagonal). Advantageously, no mechanical movement is required. The image-side field of view angle is <=6 degrees, which matches the incidence angle of the tunable optical filter 131 without vignette. FIG. 8A is a test result captured by the camera for detecting a pixel defect. Table I below shows the relationship between the image-side FOV angle and the image and object height.

TABLE I

Relationship between the image-side FOV angle and the image and object height

| Image-side field of view angle | Image height | Object height |
|---|---|---|
| 0 | 0 | 2.13E−14 |
| <1.25° | 4.37 | 22.5 |
| <2.5° | 8.75 | 45 |
| <3.75° | 13.12 | 67.5 |
| <5° | 17.5 | 90 |

Figure 8B:
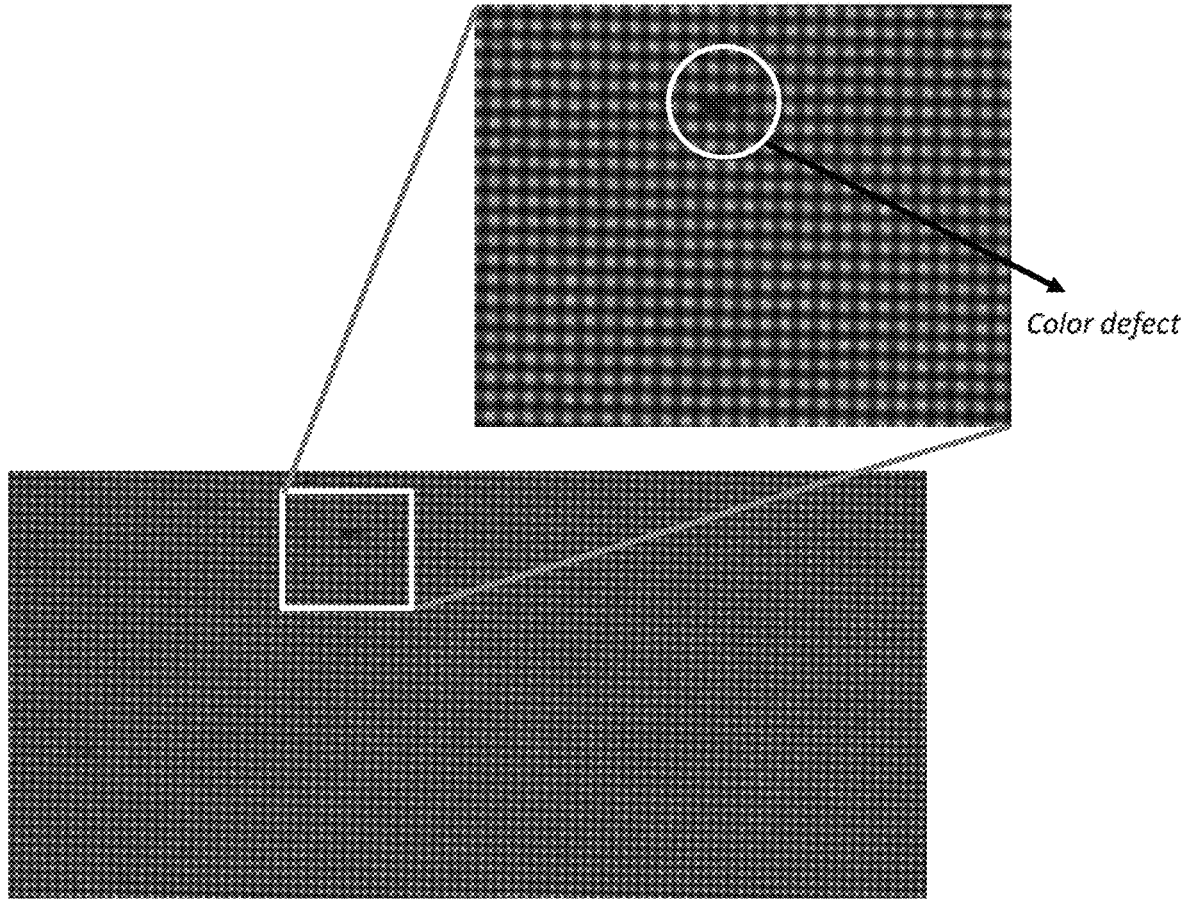
FIG. 8B is a test result captured by the spectrometer for detecting a color defect.

For the color inspection, FIG. 8B shows a test result captured by the spectrometer for detecting a color defect. Each primary color is inspected individually by electrically control the tunable optical filter 131 to allow only the red, green, or blue light to pass through the inspection system 100.

Figure 9:
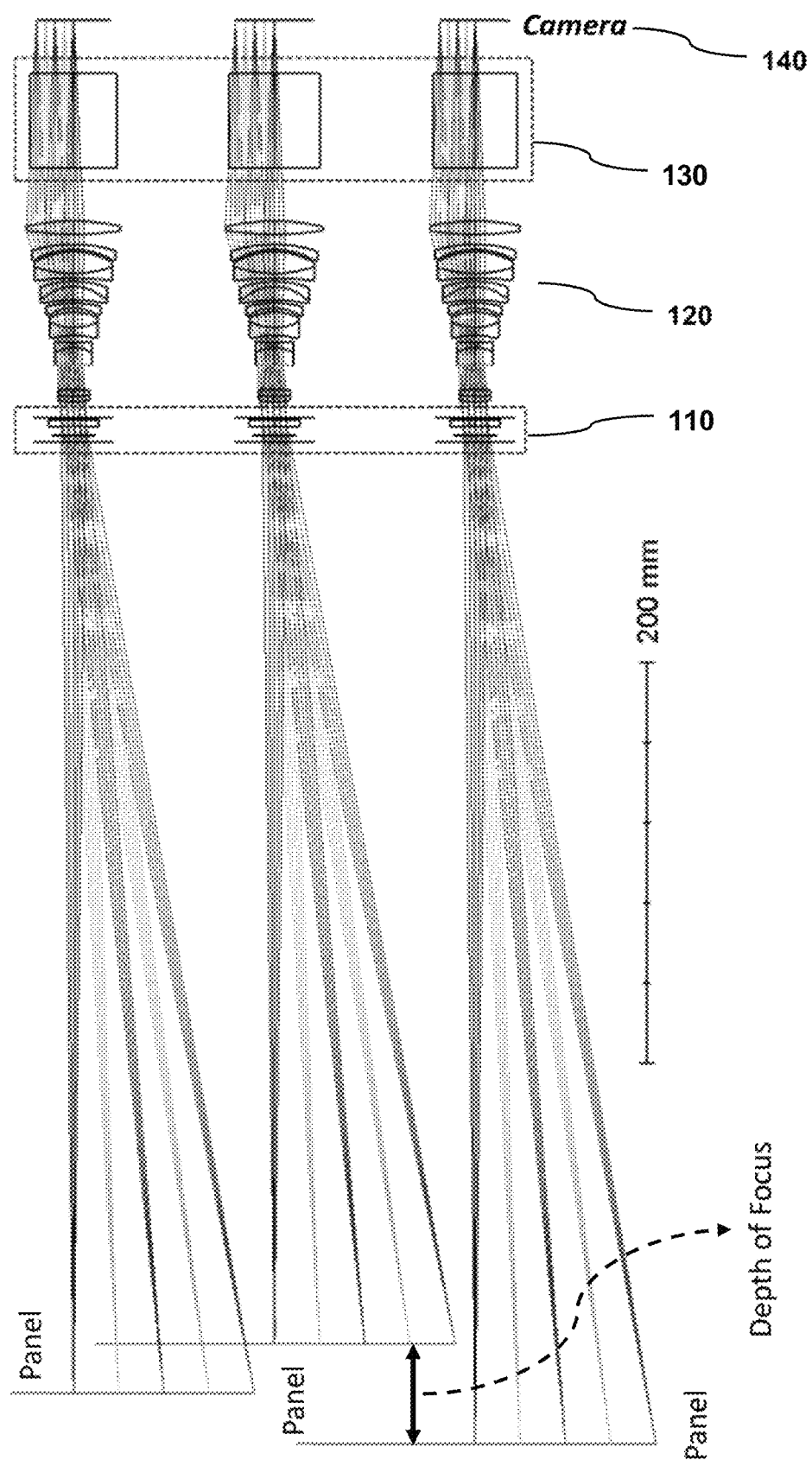
FIG. 9 is a simulation result of the inspection system of FIG. 3 for focusing at the panel with different focal positions.

FIG. 9 is a simulation result of the inspection system of FIG. 3 for focusing at the panel 10 with different focal positions. A flexible or curved display can be emulated as several objects positioned at a different distance away from the inspection system 100. The depth of focus defines the degree of flexibility of the panel 10 that can be inspected. Preferably, the liquid lens 111 adjusts the focus automatically until a sharp image of the panel 10 is captured. In certain embodiments, the panel 10, which is a flexible display, is mounted on a platform for inspection, which also defines the depth of focus for each region. The liquid lens 111 is electrically controlled to focus on each region of the flexible display.

Figure 10:
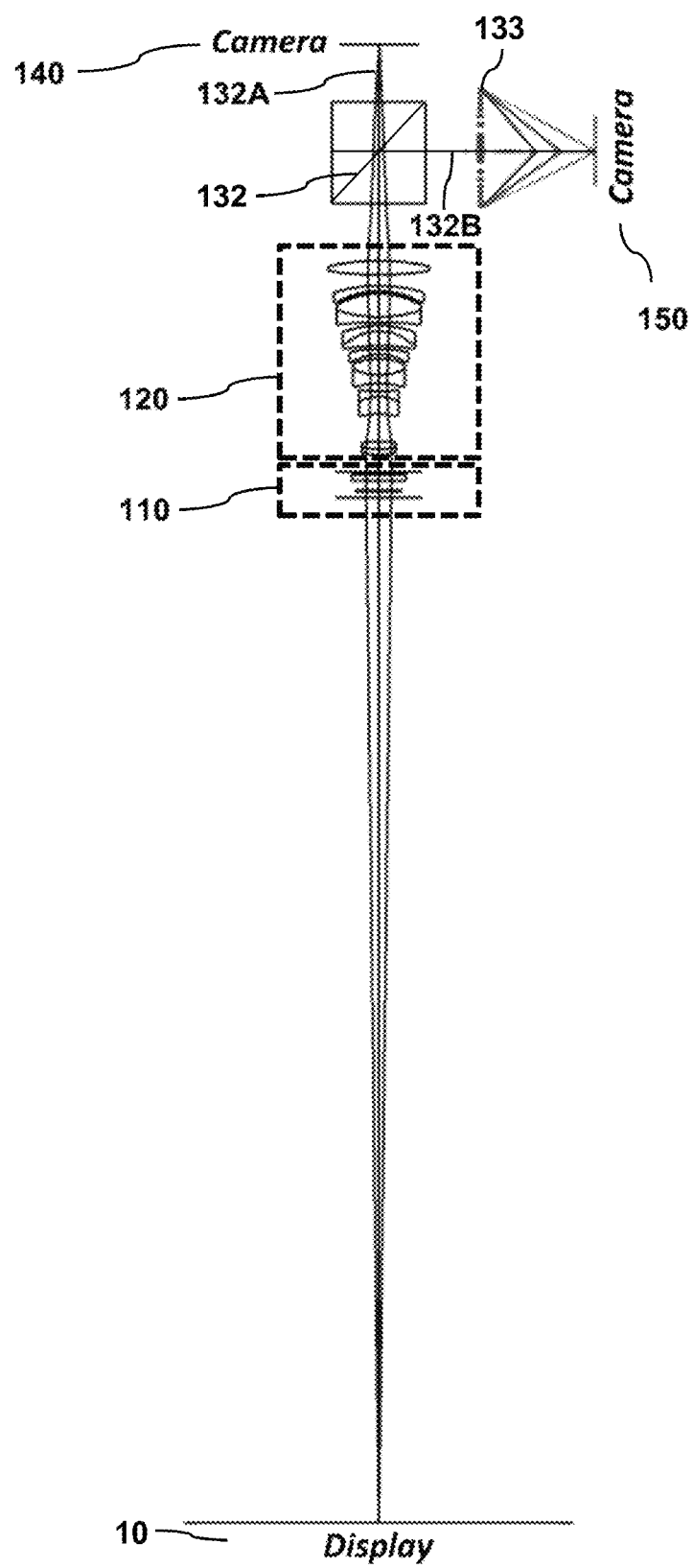
FIG. 10 depicts a third configuration of the optical elements using a linear Fresnel zone plate for color inspection.
Figure 11A:
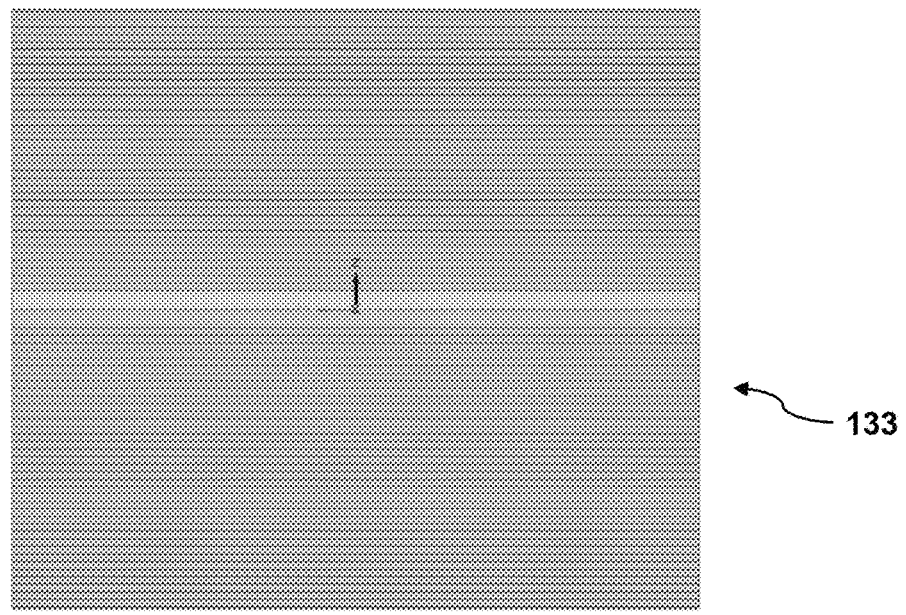
FIG. 11A depicts one possible design of the linear Fresnel zone plate of FIG. 10.
Figure 11B:
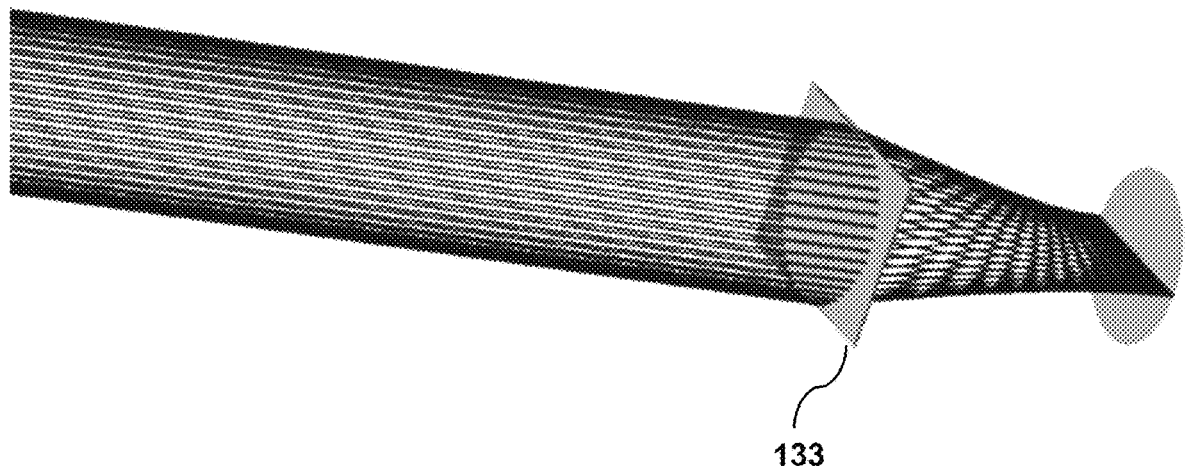
FIG. 11B depicts the transmission of light beam across the linear Fresnel zone plate of FIG. 11A.

In accordance with the third configuration, as illustrated in FIG. 10, the one or more optical elements 130 comprise a linear Fresnel zone plate 133 and a beam splitter 132 configured to split the light beam into a first sub-beam 132A incident to the first sensing unit 140 and a second sub-beam 132B incident to a second sensing unit 150. The second sub-beam 132B is reflected by 90 degrees from the optical path, and passes through the linear Fresnel zone plate 133. FIG. 11A shows one possible design of the linear Fresnel zone plate 133, which is different from the conventional Fresnel zone plate with a series of concentric grooves. The linear Fresnel zone plate 133 comprises a set of repeated rectangular bars alternating between opaque and transparent for condensing the light in a single direction along a line. The 3-dimensional representation of the transmission of the light beam across the linear Fresnel zone plate 133 is demonstrated in FIG. 11B. The linear Fresnel zone plate 133 is designed to diffract and condense the second sub-beam 132B to a row of light with different wavelengths, thereby the focus tunable lens 110 is adjusted by electrically controlling the liquid lens 111 for selecting a color to focus onto the second sensing unit 150 for inspection.

Figure 12:
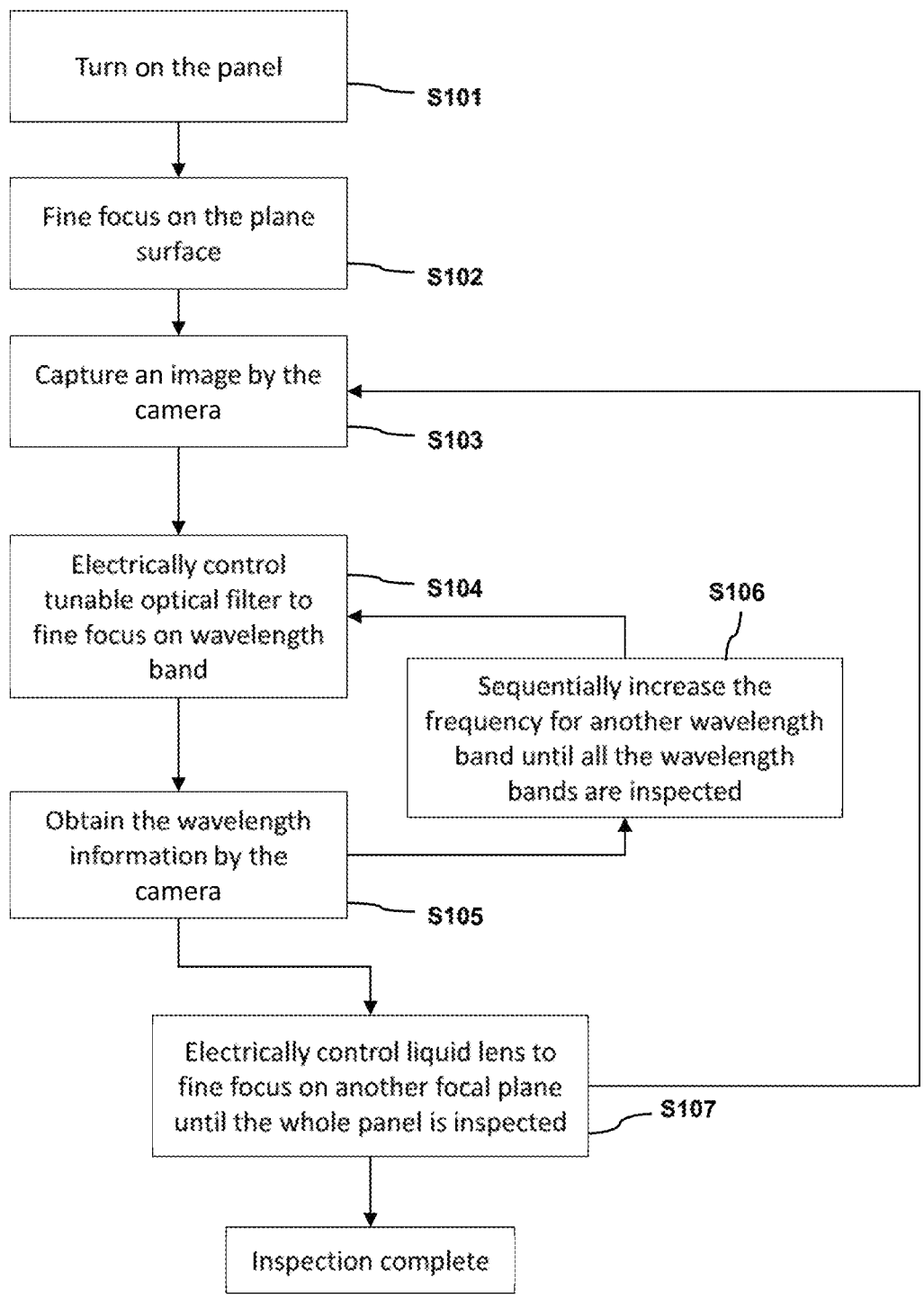
FIG. 12 is a flow chart for performing pixel defect inspection and color inspection in accordance with certain embodiments of the present disclosure.

FIG. 12 shows a flow chart for performing pixel defect inspection and color inspection. The inspection system 100 is performing a lighting-on inspection of the panel 10, so the first step is to properly initiate and turn on the panel S101. The panel 10 under inspection is a flexible display, which is preferably mounted on a platform, and the inspection system 100 is placed above the panel 10. The camera (the first sensing unit) of the inspection system 100 is fine focused on the plane surface of the panel S102, and captures the first image S103 for performing pixel defect inspection.

After inspecting the pixel, the color or wavelength of the light beam is also inspected. The tunable optical filter 131 can be electrically controlled on a transmission frequency to fine focus on the wavelength bands S104. When a transmission frequency is selected, the camera obtains the wavelength information S105 for determining any deviations in color. Then the transmission frequency of the tunable optical filter 131 is sequentially increased from low to high wavelength bands S106, or sequentially decrease from high to low wavelength bands, and step S104 and step S105 are repeated until all the wavelength bands are inspected. Subsequently, the inspection continues to the curved surface of the panel 10. The liquid lens is electrically controlled to fine focus on the curved surface S107, which is another focal plane. The steps S103-S106 are repeated to obtain the respective pixel image and wavelength information for the curved surface, until the whole panel 10 is inspected for both pixel defects and color defects.

Figure 13:
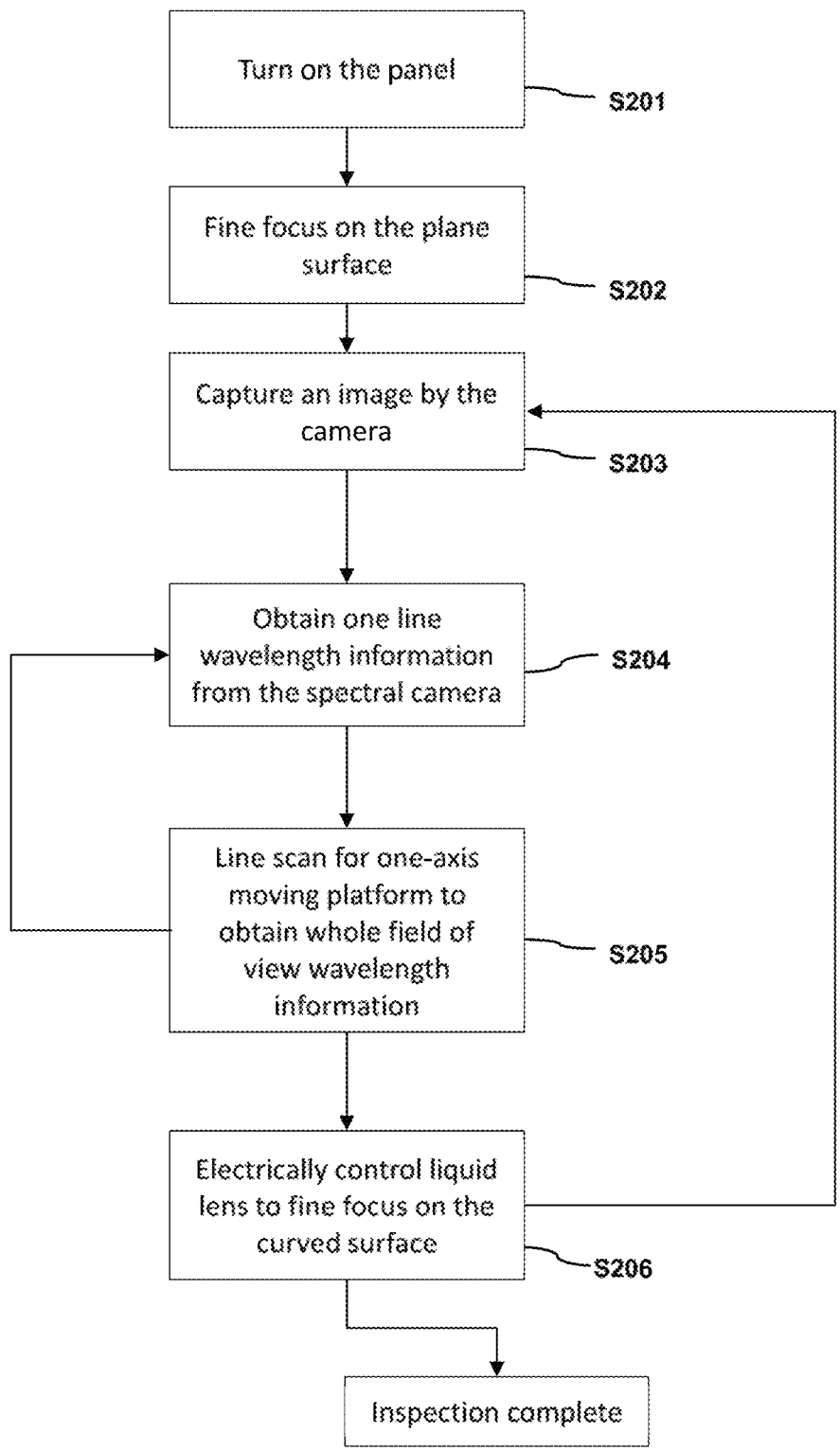
FIG. 13 is another flow chart for performing pixel defect inspection and color inspection in accordance with certain embodiments of the present disclosure.

FIG. 13 shows another flow chart for performing pixel defect inspection and color inspection. The inspection system 100 is performing a lighting-on inspection of the panel 10, so the first step is to properly initiate and turn on the panel S201. The panel 10 under inspection is a flexible display, which is preferably mounted on a platform, and the inspection system 100 is placed above the panel 10. The camera (the first sensing unit) of the inspection system 100 is fine focused on the plane surface of the panel S202, and captures the first image S203 for performing pixel defect inspection.

After inspecting the pixel, the color or wavelength of the light beam is also inspected by using a beam splitter to reflect the light beam to a spectral camera (the second sensing device). The inspection system 100 features an optical fiber bundle 151 arranged in conjugated with the surface of the spectral camera. Therefore, one-line wavelength information can be obtained from the spectral camera S204. By moving the platform along a one-axis direction, line scanning of another line can be performed until the whole field of view wavelength information is obtained S205. Subsequently, the inspection continues to the curved surface of the panel 10. The liquid lens is electrically controlled to fine focus on the curved surface S206, which is another focal plane. The steps S203-S205 are repeated to obtain the respective pixel image and wavelength information for the curved surface, until the whole panel 10 is inspected for both pixel defects and color defects.

This illustrates the fundamental inspection system for performing display inspection on a flexible display in accordance with the present disclosure. It will be apparent that variants of the above-disclosed and other features and functions, or alternatives thereof, may be combined into many other different systems or apparatuses. The present embodiment is, therefore, to be considered in all respects as illustrative and not restrictive. The scope of the disclosure is indicated by the appended claims rather than by the preceding description, and all changes that come within the meaning and range of equivalency of the claims are therefore intended to be embraced therein.

What is claimed is:

1. A display inspection system for inspecting a light beam emitted from a panel comprising pixels positioned at a plurality of focal planes, the display inspection system comprising:
    a focus tunable lens adjustable in a focal distance for focusing at the panel;
    a first sensing unit for receiving the light beam to perform a pixel inspection;
    a reduced aberration optical system arranged on an optical path between the focus tunable lens and the first sensing unit for focusing the light beam to the first sensing unit; and
    one or more optical elements placed within a back focal length of the reduced aberration optical system,
    wherein:
    the reduced aberration optical system comprises a first serial cascade lens group of a first aplanatic lens and a first doublet lens for correcting an optical aberration of the light beam incident from the focus tunable lens; and
    the first aplanatic lens and the first doublet lens are co-configured such that the back focal length is extended in a manner that the light beam is incident to the first sensing unit.

2. The display inspection system of claim 1, wherein the first doublet lens is configured to substantially cancel out a longitudinal axial chromatic aberration introduced by the first aplanatic lens.

3. The display inspection system of claim 1, wherein the reduced aberration optical system further comprises a second serial cascade lens group of a second aplanatic lens and a second doublet lens.

4. The display inspection system of claim 3, wherein the first aplanatic lens and the second aplanatic lens are made of H-LAF3B glass material or H-TF3L glass material.

5. The display inspection system of claim 4, wherein the first doublet lens and the second doublet lens are made of H-ZPK5 glass material or H-LAK7A glass material.

6. The display inspection system of claim 3, wherein the reduced aberration optical system further comprises an aspherical lens and a meniscus lens sequentially arranged and placed between the first serial cascade lens group and the second serial cascade lens group.

7. The display inspection system of claim 3, wherein the reduced aberration optical system further comprises a converging lens arranged after the second serial cascade lens group on the optical path for directing the light beam through the one or more optical elements to the first sensing unit.

8. The display inspection system of claim 1, wherein the focus tunable lens comprises a liquid lens and a front focal plane of the reduced aberration optical system, wherein the liquid lens is adjustable in the focal distance by changing a driving voltage applied.

9. The display inspection system of claim 8, wherein the liquid lens is positioned at an aperture position.

10. The display inspection system of claim 8, wherein the liquid lens is electrically controllable to fine focus on the plurality of focal planes.

11. The display inspection system of claim 1, wherein the one or more optical elements comprise a tunable optical filter configured to extract a predetermined range of wavelength from the light beam and transmit to the first sensing unit.

12. The display inspection system of claim 11, wherein the tunable optical filter further comprises a cascade of plural wavelength selectors, wherein:
- each wavelength selector comprises a first linear polarizer, a retarder, one or more liquid crystal layers, and a second linear polarizer; and
- each wavelength selector is configured to be electrically controlled to transmit a narrow bandwidth of a wavelength band.

13. The display inspection system of claim 12, wherein the tunable optical filter is electrically controllable on a transmission frequency to fine focus on the wavelength bands, thereby a whole field of view wavelength information is obtainable by sequentially increasing or decreasing the transmission frequency of the tunable optical filter.

14. The display inspection system of claim 1, wherein the one or more optical elements comprise a beam splitter configured to split the light beam into a first sub-beam incident to the first sensing unit and a second sub-beam incident to a second sensing unit.

15. The display inspection system of claim 14, wherein the first sensing unit and the second sensing unit are different and selected from a group consisting of a monochrome camera, a spectrometer, or a spectral camera.

16. The display inspection system of claim 15 further comprising an optical fiber bundle arranged in conjugated with the spectral camera for conveying a line of the light beam to the monochrome camera or the spectral camera for inspection.

17. The display inspection system of claim 13, wherein the second sub-beam passes through a linear Fresnel zone plate for diffracting the second sub-beam to a row of light with different wavelengths, thereby the focus tunable lens is adjusted for selecting a color for inspection.

18. The display inspection system of claim 17, wherein the linear Fresnel zone plate comprises a set of repeated rectangular bars alternating between opaque and transparent.

19. The display inspection system of claim 1, wherein the back focal length is extended such that the light beam is incident to the first sensing unit with an angle of incidence of less than or equal to +/−6 degrees.

20. A method for inspecting a light beam emitted from a panel comprising pixels positioned at a plurality of focal planes, the method comprising the steps of:
- initiating and turning on the panel;
- placing an inspection system above the panel, wherein the inspection system comprises a camera, a spectrometer, a liquid lens, a reduced aberration optical system, and a tunable optical filter;
- focusing the camera on a plane surface of the panel;
- capturing a first image for performing pixel defect inspection;
- electrically controlling a transmission frequency of the tunable optical filter to select a wavelength band;
- obtaining a wavelength information for determining any deviations in color;
- sequentially increasing or decreasing the transmission frequency of the tunable optical filter and obtaining wavelength information for other wavelength bands; and
- electrically controlling the liquid lens to focus on a curved surface of the panel for performing pixel defect inspection and obtaining wavelength information for the curved surface, wherein:
- the reduced aberration optical system comprises a first serial cascade lens group of a first aplanatic lens and a first doublet lens for correcting an optical aberration of the light beam incident from the liquid lens; and
- the first aplanatic lens and the first doublet lens are co-configured such that a back focal length of the reduced aberration optical system is extended in a manner that the light beam is incident to the camera with an angle of incidence of less than or equal to +/−6 degrees.

21. A method for inspecting a light beam emitted from a panel mounted on a platform, the panel comprising pixels positioned at a plurality of focal planes, the method comprising the steps of:
- initiating and turning on the panel;
- placing an inspection system above the panel, wherein the inspection system comprises a camera, a spectral camera, a liquid lens, a reduced aberration optical system, and an optical fiber bundle;
- focusing the camera on a plane surface of the panel;
- capturing a first image for performing pixel defect inspection;
- obtaining a one-line wavelength information from the spectral camera, wherein the optical fiber bundle is arranged in conjugated with the spectral camera;
- moving the platform along a one-axis direction;
- performing line scanning of another line until a whole field of view wavelength information is obtained; and
- electrically controlling the liquid lens to focus on a curved surface of the panel for performing pixel defect inspection and obtaining wavelength information for the curved surface, wherein:
- the reduced aberration optical system comprises a first serial cascade lens group of a first aplanatic lens and a first doublet lens for correcting an optical aberration of the light beam incident from the liquid lens; and
- the first aplanatic lens and the first doublet lens are co-configured such that a back focal length of the reduced aberration optical system is extended in a manner that the light beam is incident to the camera with an angle of incidence of less than or equal to +/−6 degrees.

* * * * *